United States Patent
Wack et al.

(10) Patent No.: US 7,267,212 B2
(45) Date of Patent: Sep. 11, 2007

(54) TORSIONAL VIBRATION DAMPER

(75) Inventors: Erwin Wack, Niederwerrn (DE); Horst Breier, Dittelbrunn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 287 days.

(21) Appl. No.: 11/078,007

(22) Filed: Mar. 11, 2005

(65) Prior Publication Data

US 2005/0239557 A1  Oct. 27, 2005

(30) Foreign Application Priority Data

Apr. 21, 2004  (DE) ...................... 10 2004 019 223

(51) Int. Cl.
*F16H 45/02*  (2006.01)

(52) U.S. Cl. ................... 192/3.29; 192/70.17; 192/212

(58) Field of Classification Search ...................... None
See application file for complete search history.

(56) References Cited

U.S. PATENT DOCUMENTS

| | | | |
|---|---|---|---|
| 5,810,138 A | | 9/1998 | Bertram et al. |
| 6,244,962 B1 | * | 6/2001 | Bacher et al. ........... 464/68.92 |
| 6,332,843 B1 | * | 12/2001 | Hashimoto ............... 464/68.92 |

* cited by examiner

*Primary Examiner*—Saul Rodriguez
(74) *Attorney, Agent, or Firm*—Cohen Pontani Lieberman & Pavane LLP

(57) ABSTRACT

A torsional vibration damper for a lockup clutch of a hydrodynamic clutch arrangement is provided with a drive-side transmission element and a driven-side transmission element which can deflect around a rotational angle relative to each other against the action of energy accumulators. The transmission elements have recesses for receiving an energy accumulator, respectively, which can be supported by its respective end coils at respective circumferential ends of the recess. The circumferential ends of every recess are oriented, respectively, substantially along a first connection line to a first center of curvature. However, the circumferential end coils of every energy accumulator are oriented substantially along a second connection line to a second center of curvature in the absence of a relative rotational deflection of the transmission elements. The second connection line is oriented at an initial set angle relative to the first connection line. At the start of a relative rotational deflection of the transmission elements until reaching a predetermined limiting relative rotational deflection, a change in the set angle between the second connection line and the first connection line to a final set angle is initiated at the respective end coil of every energy accumulator. The end coils of every energy accumulator undergo at least substantially no further change in the final set angle when a relative rotational deflection exceeds the predetermined limiting relative rotational deflection.

13 Claims, 4 Drawing Sheets

TORSIONAL VIBRATION DAMPER

BACKGROUND OF THE INVENTION

1. Field of the Invention

The present invention is directed to a torsional vibration damper having a drive-side transmission element and a driven-side transmission element which can deflect rotationally relative to each other against the action of energy accumulators.

2. Description of the Related Art

U.S. Pat. No. 5,810,138 discloses a torsional vibration damper with a drive-side transmission element, a driven-side transmission element, and energy accumulators operatively arranged therebetween. This torsional vibration damper is associated with the piston of a lockup clutch of a hydrodynamic clutch arrangement, e.g., a torque converter. For this purpose, the torsional vibration damper is connected by its drive-side transmission element to the piston of the lockup clutch so as to be fixed with respect to rotation relative to it, while the driven-side transmission element is fastened to a sleeve that is connected to a transmission input shaft so as to be fixed with respect to rotation relative to it.

The energy accumulators are arranged on a relatively small radius around the axis of rotation and are arranged tangentially in recesses of the transmission elements. In the operating state, the center coils of the energy accumulators on the circumference side are extensively bent radially outward due to centrifugal force. This bending is limited by the radial outer side of the recesses. Accordingly, the coils of the energy accumulators are protected against extreme bending loads on the one hand; but on the other hand a friction action is caused between the coils of the energy accumulators and the radial outer sides of the recesses during a relative rotational deflection of the two transmission elements. This friction action increases as the rotational speed increases. However, since there are normally no large torsional vibrations in the range of higher rotational speeds, the decoupling quality of the torsional vibration damper is substantially worsened as a result of the aforementioned friction action.

SUMMARY OF THE INVENTION

It is the object of the invention to construct a torsional vibration damper in such a way that a friction action of coils of the energy accumulator at recesses of transmission elements due to centrifugal force is excluded as far as possible.

According to the invention, recesses which are provided in the transmission elements and which serve, respectively, to receive an energy accumulator are formed with circumferential ends that are oriented, respectively, along a first connection line VL1 to a first center of curvature. Circumferential end coils of the energy accumulators are oriented along a second connection line VL2 to a second center of curvature in the absence of a relative rotational deflection of the transmission elements. When the second connection line VL2 is oriented at an initial set angle $\alpha_{anf}$ relative to the first connection line VL1, a change in a set angle $\alpha$ is initiated at the start of a relative rotational deflection of the transmission elements, namely, proceeding from the initial set angle $\alpha_{anf}$ to a final set angle $\alpha_{end}$ which is likewise located between the second connection line VL2 and the first connection line VL1, until a predetermined limiting relative rotational deflection between the transmission elements is reached at the respective circumferential end coil of every energy accumulator. When there is a relative rotational deflection of the transmission elements at the circumferential end coils of every energy accumulator that goes beyond the predetermined limiting relative rotational deflection, there is no longer any change, or at least any substantial change, initiated in the set angle $\alpha$ and the final set angle $\alpha_{end}$ remains unchanged.

As long as the initial set angle $\alpha_{anf}$ exists, the end coils of the energy accumulator either come into contact only with the radial outer area of the adjacent circumferential end of a recess according to a first construction or only come into contact with the radial inner area of the adjacent circumferential end according to a second construction. Consequently, in the first construction, the end coil continuously moves farther inward away from the associated circumferential end as the radial extension increases and reaches a maximum distance in the area of the radial inner side of the recess. In the second construction the last coil on the circumference side continuously moves farther outward away from the associated circumferential end as the radial extension increases until it reaches its maximum distance in the radial outer area of the recess.

In the first construction, a pre-curved energy accumulator with a neutral energy accumulator radius ($r_{FN}$) that is only slightly greater than or substantially equal to the mean radius ($r_m$) of the recess is preferably selected. Due to the fact that the end coils of the energy accumulator initially contact the circumferential ends of the recesses only at the radial outer side, a deformation force acts on the energy accumulator in its radial outer area at the start of a relative rotational deflection of the transmission elements, resulting in a stabilizing force directed counter to the centrifugal force, that is, acting substantially radially inward. The bending of the energy accumulator caused by centrifugal force is substantially reduced in this way.

A pre-curved energy accumulator is also used in the second construction, but with an appreciably greater neutral energy accumulator radius ($r_{FN}$) compared to the mean radius ($r_m$) of the recess. Inserted into the recess, the energy accumulator contacts the circumferential ends of the recess by its end coils substantially only in the radial inner area. As the relative rotational deflection of the transmission elements begins, a deformation force is introduced to the energy accumulator only in its radial inner area, which reinforces the readiness of the energy accumulator to orient itself in accordance with its smaller curvature relative to the recess, resulting in a stabilizing force that is directed counter to the centrifugal force and acts substantially radially inward. The bending of the energy accumulator caused by centrifugal force is accordingly also substantially reduced in this construction.

In both of the constructions described above, a positive effect results simultaneously with respect to the spring characteristic:

Due to the fact that only a radial portion of the last coil of the energy accumulator on the end makes contact, the deformation of the energy accumulator starts with a comparatively slight spring stiffness that increases progressively as the relative rotational deflection between the transmission elements increases, since the energy accumulator is supported at the adjacent circumferential end of the recess by an increasingly larger radial portion of its end coil as the relative rotational deflection increases. This process is not concluded until after the limiting relative rotational deflection is reached when the final set angle $\alpha_{end}$ is less than the initial set angle $\alpha_{anf}$ and, ideally, is even equal to zero. The end coil of the energy accumulator then contacts the circumferential end of the recess substantially over its entire surface.

From this point onward, the first deformation conditions VB1 of the energy accumulator described above, under which the energy accumulator deforms with a first stiffness increase FS1, are terminated and second deformation conditions VB2, under which the energy accumulator deforms according to a second stiffness increase FS2, are established. Accordingly, as a result of the inventive construction of the circumferential ends of the recesses and of the end coils of the energy accumulators, a substantially two-step spring characteristic can be realized with a particularly soft response characteristic in case of slight relative rotational deflections and with a comparatively high spring stiffness in case of larger relative rotational deflections.

The respective energy accumulator is advantageously inserted in the associated recess without substantial pretensioning so that a pretensioning need not be overcome initially in case of very small relative rotational deflections between the transmission elements, particularly during a transition from pull to push, before making use of the elasticity of the energy accumulator. Instead, the energy accumulators can be inserted in the recesses in such a way that a free angle, advantageously about 0.5°, in circumferential direction can be available in both deflecting directions.

In a useful combination of the steps discussed above, a free position is provided simultaneously at the radial outer side of the respective recess for an energy accumulator, which free position prevents contact between the coils of the energy accumulator and the radial outer side and, therefore, prevents unwanted friction action. This free position is preferably produced by a curvature of the radial outer side of the recess with a free position radius $r_{FR}$ around a center of curvature D3 which is considerably smaller than an outer radius $r_a$ of a radial outer side of the recess around a center of curvature D2, which radial outer side $r_a$ is not provided with a free position and is used for purposes of comparison. Accordingly, the coils of the energy accumulator are provided with more space to penetrate inside the recess in the intermediate area of the energy accumulator than in the area of the end coils which are usually subjected to a much smaller radial deflection caused by centrifugal force than the coils in the intermediate area. By means of this construction, a free space is created on the radial outer side for the energy accumulator without appreciably enlarging the recess in radial direction. This prevents unnecessary material weakening of the transmission elements. Of course, with respect to the radial dimensioning of the recesses, particularly in their radial outer area, it is advantageous that the energy accumulators are bent outward only to a limited extent due to their clamping, according to the invention, between the two circumferential ends under the influence of the stabilizing force mentioned above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
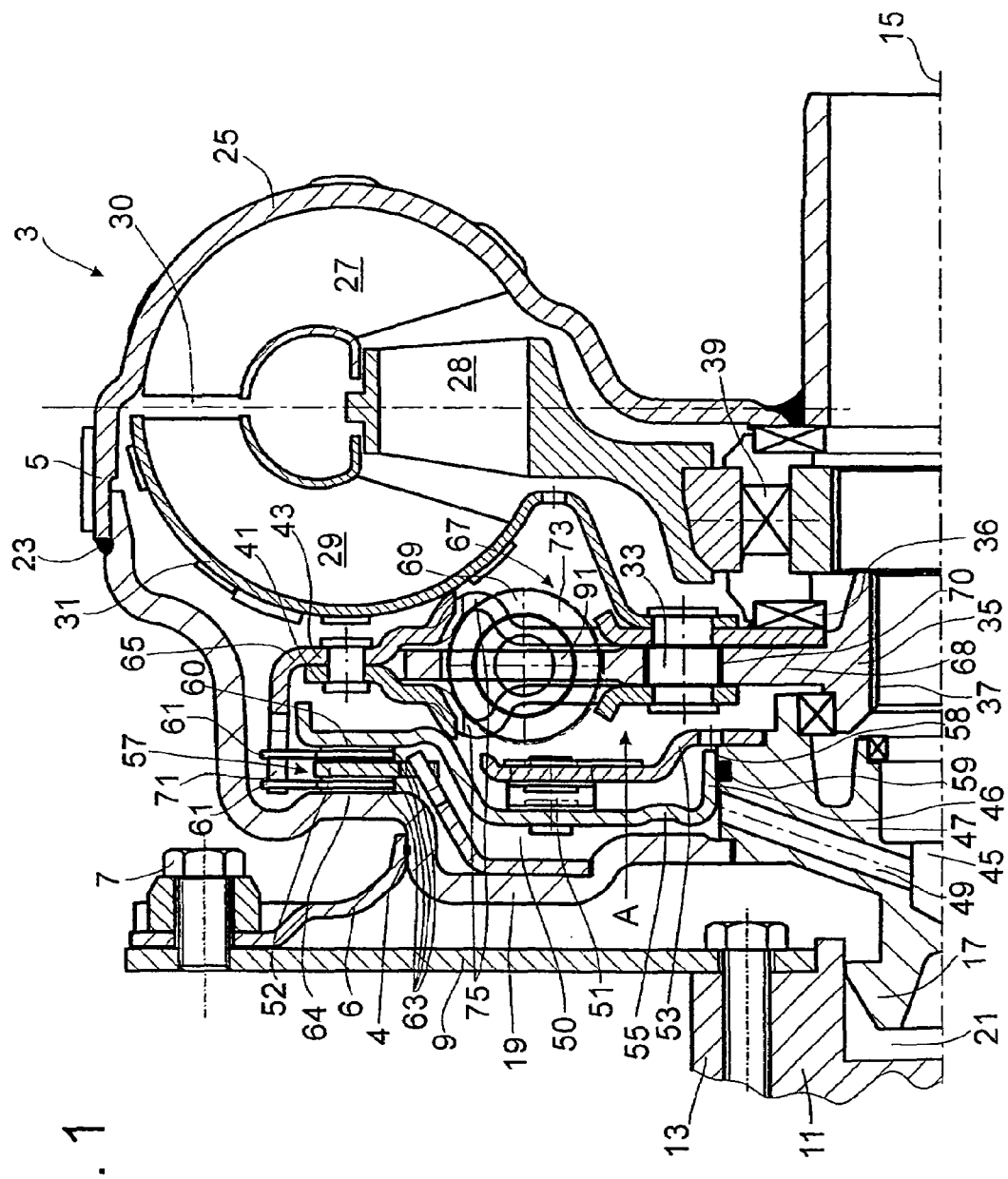
FIG. 1 shows the upper half of a longitudinal section through a hydrodynamic clutch arrangement with a piston of a lockup clutch and a torsional vibration damper associated with the latter.

The hydrodynamic clutch device 3 shown in FIG. 1 has a clutch housing 5 to which a connection plate 6 is fastened by means of a weld 4. The connection plate 6 can be connected to a drive 11, e.g., the crankshaft 13 of an internal combustion engine, for joint rotation therewith by a plurality of receiving elements 7 and a coupling element 9, e.g., a flexplate.

Further, in the area of an axis of rotation 15, the clutch device 3 has a bearing pin 17 that is provided at a cover 19 of the housing 5 and received in a centering guide 21 provided at the drive 11.

The cover 19 is fixedly connected by a weld 23 to an impeller shell 25 of an impeller 27 which cooperates with a turbine 29 and a stator 28 while forming a hydrodynamic circuit 30. The turbine 29 has a turbine shell 31 which is centered relative to a turbine hub 35 that contacts a freewheel 39 of the stator 28 by means of an axial bearing 36. The turbine hub 35 is in a rotational connection by means of teeth 37 with a transmission input shaft, not shown, which is arranged radially inside the turbine hub. Transmission input shafts of this type are usually connected to a center bore hole that opens into a transitional space 45 connected by through-openings 49 in a housing hub 47 to a pressure chamber 50 which is provided axially between the cover 19 and a piston 55 of the lockup clutch 57. A piston carrier 53 is associated with the piston 55 and is fastened to the housing hub 47 by means of tangential leaf springs 51 to produce a nonrotating connection between the piston 55 and cover 19.

The piston 55 is tightly received by its piston foot 46 formed on the radial inner side at a receptacle 58 of the housing hub 47 by means of a seal 59 and comes into contact in its radial outer area with a friction surface 60 at a friction lining 63 of a plate 61. This plate 61 can be supported at a friction surface 64 of the cover 19 by means of another friction lining 63, an intermediate plate 52 and another plate 61 with friction linings 63 on both sides. The plates 61 are nonrotatably connected with teeth 71 of a drive-side transmission element 65 of a torsional vibration damper 67. This drive-side transmission element 65 is formed by cover plates 41 and 43 and is fastened to the turbine shell 31 by a rivet connection 33. The drive-side transmission element 65 is supported by a circumferential spring set 69 at a driven-side transmission element 68 of the torsional vibration damper 67, formed by the turbine 35 in this specific construction. The rivet connection 33 which engages in associated cutouts 70 with a predetermined circumferential play limits the relative rotational deflection between the drive-side transmission element 65 and driven-side transmission element 68.

Figure 2:
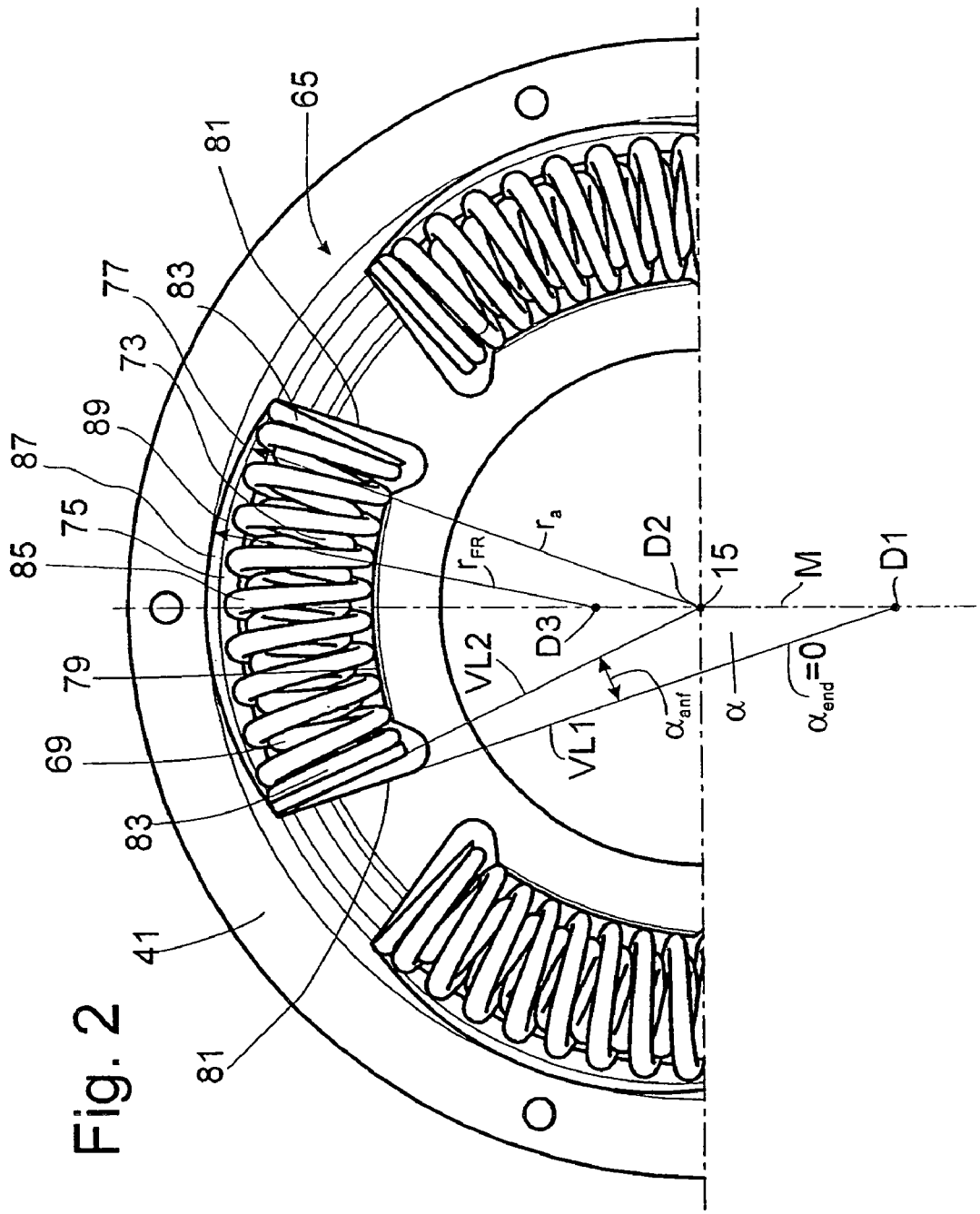
FIG. 2 is a plan view of a first embodiment of the torsional vibration damper in viewing direction A from FIG. 1 wherein end coils of energy accumulators of the torsional vibration damper contact the radial outer area of circumferential ends of recesses for the energy accumulator.

FIG. 2 shows the cover plate 41 of the drive-side transmission element 65 of the torsional vibration damper 67, which cover plate 41 faces the piston 55 of the lockup clutch 57. Energy accumulators 73 of the circumferential spring set 69 that are received in recesses 70 of the cover plate 41 are likewise contained in the cover plate 43 facing the turbine 29. Further, each of the energy accumulators 73 received in the recesses 75 is in an operative connection with control elements 91 (FIG. 1) which are provided at the driven-side transmission element 68, therefore, at the turbine hub 35, and extend radially outward.

As can be seen clearly from FIG. 2, every recess 75 comprises a radial outer side 77 and a radial inner side 79 by which two circumferential ends 81 are connected to one another. The energy accumulator 73 arranged in the recess 75 has circumferential end coils 83, each of which faces a circumferential end 81 of the recess 75, and a plurality of intermediate coils 85 provided between the two end coils 83.

FIG. 2 shows the state of the energy accumulators 73 inside the respective recess 75 with free rotational deflection between the two transmission elements 65 and 68 of the torsional vibration damper 67. The individual energy accumulators 73 are inserted into the respective recess 75 without pretensioning and can even be provided with a small, predetermined free angle relative to the circumferential ends 81 of the recesses 75.

Figure 5:
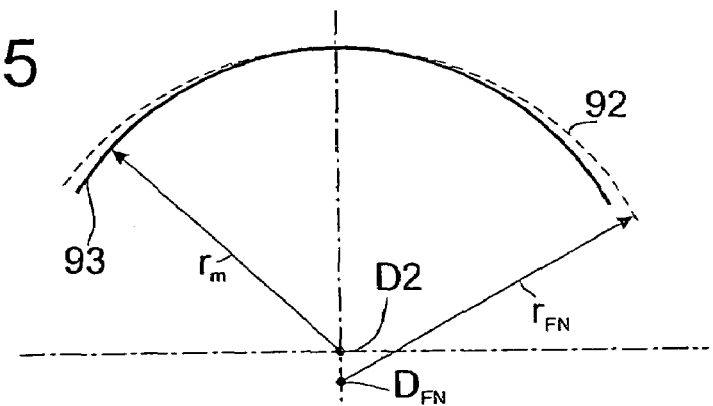
FIG. 5 is a graph showing the neutral spring radius $r_{FN}$ in relation to the mean radius $r_m$ of the recess according to FIG. 2.

The energy accumulators 73 are constructed so as to be already pre-curved and have a center line 92 which corresponds to their curvature and which is shown in dashes in FIG. 5 which is related to FIG. 2. The energy accumulator center line 92 extends around a virtual center of curvature $D_{FN}$ with a neutral energy accumulator radius $r_{FN}$. Further, FIG. 5 shows, in solid lines, a recess center line 93 which is associated with the recesses 75 and which extends around a center of curvature D2 with a mean recess radius $r_m$. In the construction according to FIG. 2, the neutral energy accumulator center line 92 with its neutral energy accumulator radius $r_{FN}$ around the center of curvature $D_{FN}$ is only insignificantly larger than the recess center line 93 with the mean recess radius $r_m$ around the center of curvature D2. It is also conceivable that the energy accumulator center line 92 is identical to the recess center line 93.

FIG. 2 shows that the center of curvature D2 mentioned above can coincide with the axis of rotation 15 of the clutch housing. Further, FIG. 2 shows another center of curvature D1 that is lengthened radially inward by a connection line VL1 proceeding from the circumferential end 81 of the recess 75 until it intersects with a center axis M of the respective recess 75. A second connection line VL2 is formed by extending the circumferential end coil 83 of the energy accumulator 73 radially inward until this connection line VL2 intersects the above-mentioned center line M of the recess 75. Because of this geometric arrangement of the energy accumulator 73 and recess 75, an initial set angle $\alpha_{anf}$ is formed between the two connection lines VL1 and VL2 which causes the circumferential end coil 83 of the energy accumulator 73 to contact the adjacent circumferential end 81 of the recess 75 only in the radial outer area when there is free rotational deflection of the transmission elements 65, 68. As soon as a relative rotational deflection occurs between the transmission elements 65 and 68 of the torsional vibration damper 67, a force generating a radially inwardly directed stabilizing force at the energy accumulator 73 is exerted on the energy accumulator 73 by way of its end coil 83, so that the energy accumulator 73 does not contact the radial outer side 77 of the recess 75 under centrifugal force, particularly with its intermediate coils 85.

An increasing relative rotational deflection of the two transmission elements 65 and 68 relative to one another causes the energy accumulator 73 to be pressed with increasing force against the circumferential end 81 of the recess 75 by its end coil 83 and accordingly, starting from the radial outer side, the energy accumulator 73 is supported at the associated circumferential end 81 by an increasingly larger radial portion. Accordingly, the set angle $\alpha$ between the connection lines VL1 and VL2 decreases continuously starting from the initial set angle $\alpha_{anf}$ until it is reduced below a predetermined limiting relative rotational deflection between the transmission elements 65 and 68 to value 0. As is shown in FIG. 2, connection line VL2 coincides connection line VL1 when the limiting relative rotational deflection is reached, angle $\alpha$ has become a final set angle $\alpha_{end}$ taking on the value of zero.

When the relative rotational deflection of the transmission elements 65, 68 goes beyond the predetermined limiting relative rotational deflection, the end coil 83 of every energy accumulator 73 always contacts the adjacent circumferential end 81 of the recess 75 over its entire surface.

Figure 4:
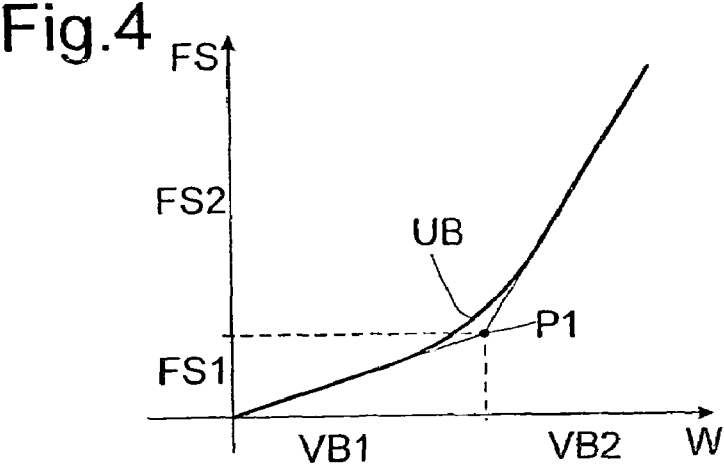
FIG. 4 is a graph showing the increase in stiffness at the torsional vibration damper as a function of the relative rotational deflection of the transmission elements.

FIG. 4 shows how the process between the end coil 83 of the energy accumulator 73 and the circumferential end 81 of the recess 75 affects the spring characteristic of the torsional vibration damper 67. In FIG. 4, the spring stiffness FS is shown over the spring path W. In a first deformation area VB1, the spring stiffness FS1 increases progressively until reaching an end point P1. This first deformation area VB1 of the energy accumulator corresponds to the behavior of the end coil 83 relative to the circumferential end 81 when traversing the angle $\alpha$ between $\alpha_{anf}$ and $\alpha_{end}$. As soon as the end coil 83 contacts the circumferential end 81 over its entire surface after reaching the limiting relative rotational deflection at the transmission elements 65, 68, the second deformation area VB2 with the spring stiffness FS2 commences. This spring stiffness FS2 now exhibits a conventional spring characteristic. It should be added that, according to FIG. 4, the transition between the two deformation areas VB1 and VB2 at point P1 is not completed suddenly, but rather in the form of a continuous transmission region UB, shown in the form of a graph, between the two spring stiffnesses FS1 and FS2.

Figure 3:
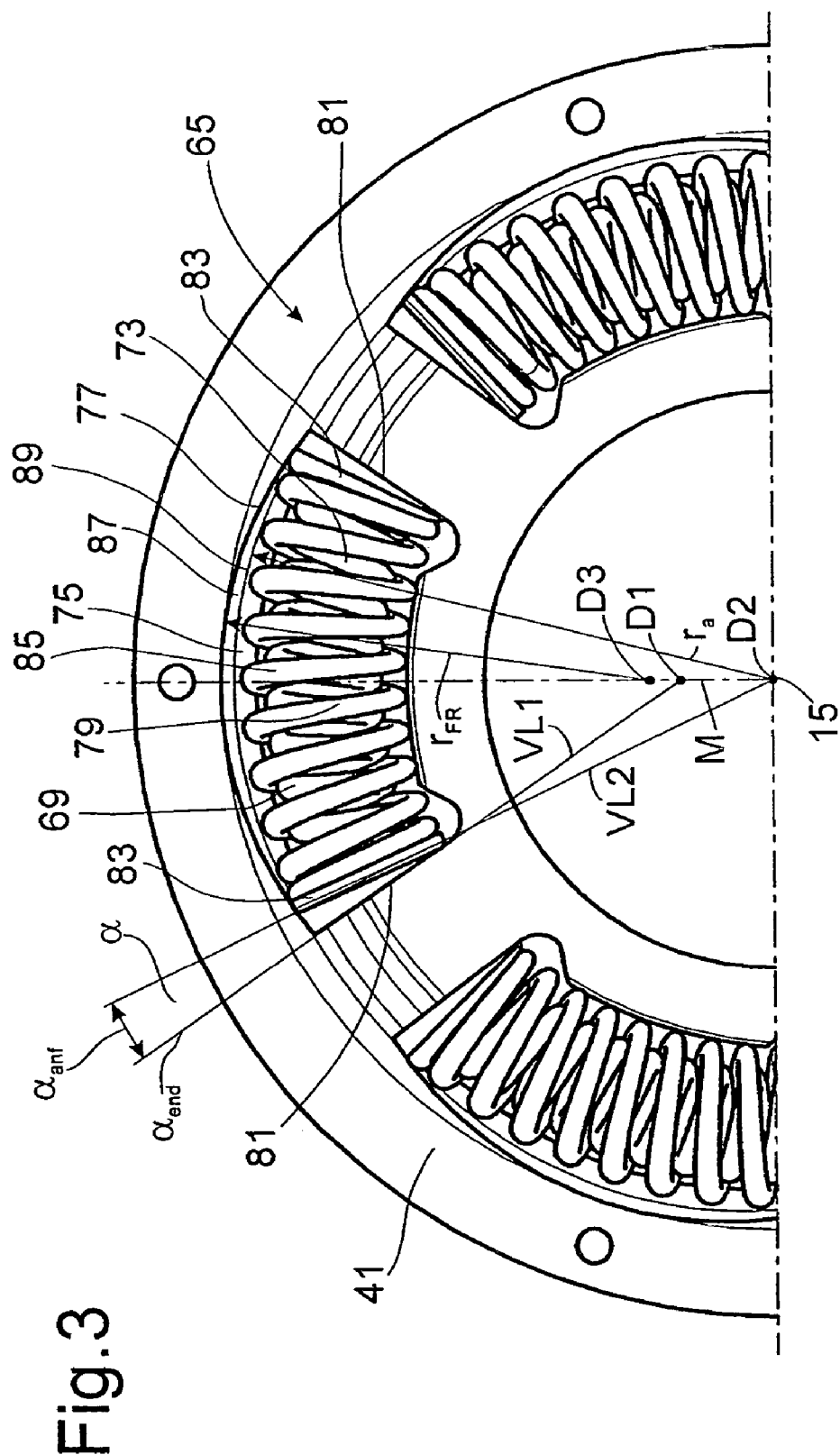
FIG. 3 is a plan view of a second embodiment wherein the end coils of the energy accumulators of the torsional vibration damper contact the radial inner area of the circumferential ends of the recesses.

The construction according to FIG. 3 differs from that according to FIG. 2 by the shape of the circumferential ends 81 of the respective recess 75. The connection line VL1 intersecting the center axis M of the recess 75 in the extension of the respective circumferential end 81 is oriented relative to the connection line VL2 associated with the end coils 83 of the energy accumulator 73 in such a way that the respective end coil 83, assuming the absence of relative rotational deflection of the transmission elements 65, 68, contacts the adjacent circumferential end 81 only in the radial inner area. As was already explained with reference to FIG. 2, there exists in this operating state a set angle $\alpha$ that is increasingly reduced at the start of a relative rotational deflection between the transmission elements 65, 68 from an initial set angle $\alpha_{anf}$ until the final set angle $\alpha_{end}$ is finally occupied when the predetermined limiting relative rotational deflection is reached, at which final set angle $\alpha_{end}$, insofar as it is equal to zero, the respective end coil 83 makes full-surface contact with the associated circumferential end 81. As was already described at length with reference to FIG. 2, the contact surface of the end coils 83 of the energy accumulator 73 at the adjacent circumferential end 81 of the recess 75 increases in the area of the set angle α between $\alpha_{anf}$ and $\alpha_{end}$ as the relative rotational deflection of the transmission elements 65, 68 increases, specifically, in FIG. 3, proceeding from the radial inner side to the radial outer side. The spring characteristic also corresponds to the view in FIG. 4.

Figure 6:
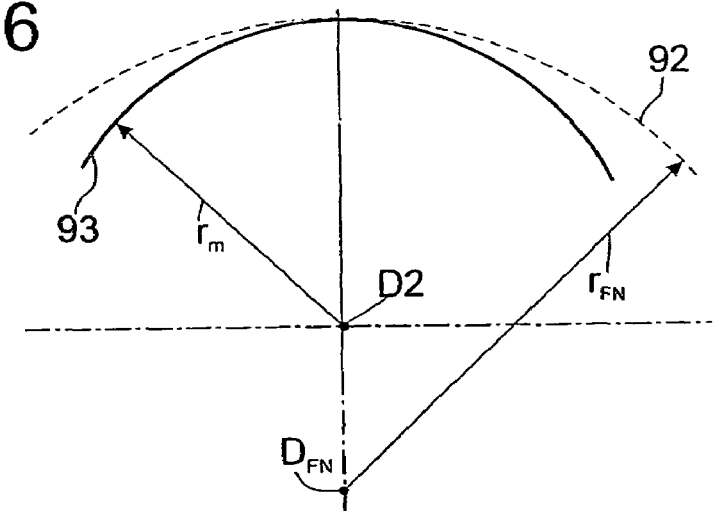
FIG. 6 corresponds to the view in FIG. 5, but shows the recess constructed according to FIG. 3.

In order to also obtain a stabilizing force in the construction according to FIG. 3 that acts against the centrifugal force, particularly at the intermediate coils 85 of the energy accumulator 72, these coils 85 are formed, according to FIG. 6, with a neutral energy accumulator radius $r_{FN}$ around a center of curvature $D_{FN}$ which is appreciably greater than the mean recess radius $r_m$ around the center of curvature D2. Accordingly, in comparison to the construction according to FIG. 2, the energy accumulators 73 in FIG. 3 are less curved and therefore have a greater neutral energy accumulator radius $r_{FN}$ around the center of curvature $D_{FN}$. Because of its comparatively small curvature, the respective energy accumulator 73 tends to orient itself in the respective, more extensively curved recess 75 and the energy accumulator 73 tends to move closer to the respective circumferential end 81 with its end coils 83 in the radial inner area than it would if the curvature were greater. In combination with the construction of the circumferential end 81 according to FIG. 3, the energy accumulator 73 is loaded substantially on the radial inner side in the working region of the set angle α so that the tendency of the energy accumulator 73 to orient itself inside the recess 75 is reinforced. Because of the interrelationship of the connection lines VL1 and VL2 according to FIG. 3 and the ratio of radius $r_{FN}$ to radius $r_m$ in FIG. 6, the desired stabilizing force acting counter to the centrifugal force results when the energy accumulator 73 is controlled.

The construction according to FIG. 2 and the construction according to FIG. 3 can be provided with a free position 87 in the area of the radial outer side 77 of every recess 75. This free position 87 provides a larger penetration space for the intermediate coils 85 of the respective energy accumulator 73, particularly in the central area of the radial outer side 77. Constructing the radial outer side 77 in this way is especially advantageous because the center coils 85 undergo a comparatively large radial deflection under the influence of centrifugal force. Although this radial deflection is limited by the stabilizing force mentioned above, a contact between individual coils, particularly the center coils 85 on the circumference side, and the associated radial outer side 77 of the recess 75 is prevented by the free position 87 in every case. The free position 87 is preferably formed by a free position radius $r_{FR}$ around the center of curvature D3. This free position radius $r_{FR}$ is smaller than an outer radius $r_a$ around the axis of rotation D2. The outer radius $r_a$ would describe the radial outer side 77 without a free position 87. The radial outer side which is associated with the outer radius $r_a$ and which does not have the free position, is shown in FIGS. 2 and 3 by an artificial line 89.

According to FIG. 2 or FIG. 3, the free position 87 in the respective recess 75 is always shown in connection with the steps for generating a stabilizing force acting counter to the centrifugal force, but can also be used without these steps because it causes the distance to increase between the coils of the energy accumulator 73, particularly between the intermediate coils 85 on the circumference side, and the respective radial outer side 77 of the recesses 75 relative to a radial outer side 89 not provided with the free position and therefore at least reduces a friction action initiated by the centrifugal force between the coils of the energy accumulators 73 and the radial outer side 77 of the recess 75.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A torsional vibration damper for a lockup clutch of a hydrodynamic clutch arrangement, said vibration damper comprising:

a drive-side transmission element and a driven-side transmission element which can deflect rotationally relative to each other against the action of energy accumulators, each transmission element having a plurality of recesses, each recess having a pair of opposed circumferential ends lying on respective first connection lines to a first center of curvature, and a plurality of energy accumulators received in said recesses, each energy accumulator having a pair of opposed circumferential end coils which are supported by respective opposed circumferential ends of respective recesses in each of said transmission elements, the end coils of each energy accumulator lying on respective second connection lines to a second center of curvature, said second connection line forming a set angle with said first connection line, wherein said set angle is an initial set angle in the absence of relative rotational deflection of the transmission elements, said set angle changing from said initial set angle to a final set angle when a predetermined limiting relative rotational deflection is reached, said set angle remaining substantially constant when said predetermined limiting relative rotational deflection exceeded.

2. The torsional vibration damper of claim 1 wherein the initial set angle is greater than the final set angle.

3. The torsional vibration damper of claim 1 wherein the initial set angle is greater than zero and the final set angle is substantially equal to zero.

4. The torsional vibration damper of claim 1 wherein only radially outer parts of said end coils contact said circumferential ends of said recesses in the absence of relative rotational deflection of the transmission elements, said end coils only contacting said circumferential recesses completely when the predetermined limiting relative rotational deflection is reached.

5. The torsional vibration damper of claim 1 wherein only radially inner parts of said end coils contact said circumferential ends of said recesses in the absence of relative rotational deflection of the transmission elements, said end coils only contacting said circumferential recesses completely when the predetermined limiting relative rotational deflection is reached.

6. The torsional vibration damper of claim 1 wherein the energy accumulators are formed with a pre-curvature having a neutral energy accumulator radius.

7. The torsional vibration damper of claim 4 wherein each recess has a mean recess radius, the energy accumulators being formed with a pre-curvature having a neutral energy accumulator radius which is greater than or substantially equal to the mean recess radius.

8. The torsional vibration damper of claim 5 wherein each recess has a mean recess radius, the energy accumulators being formed with a pre-curvature having a neutral energy accumulator radius which is substantially greater than the mean recess radius.

9. The torsional vibration damper of claim 1 wherein the energy accumulators are inserted in the recesses without pretensioning.

10. The torsional vibration damper of claim 1 wherein the energy accumulators are inserted in the recesses with circumferential play.

11. The torsional vibration damper of claim 1 wherein each recess has a radial outer side and each energy accumulator has intermediate coils which are spaced from said outer side by a radial penetrating space.

12. The torsional vibration damper of claim 11 wherein the outer side of the recess has a free position radius to a third center of curvature which is less than a radius from the outer side of the energy accumulator to the second center of curvature.

13. The torsional vibration damper of claim 1 wherein the second center of curvature is on the axis of rotation of the transmission elements.

* * * * *